United States Patent
Sabatini

Patent Number: 5,942,165
Date of Patent: Aug. 24, 1999

[54] METHOD FOR MAKING IRREGULAR SHAPED CD'S AND OTHER PLAYING DISCS

[75] Inventor: Michael A. Sabatini, Maitland, Fla.

[73] Assignee: Soundshape, Inc., Winter Park, Fla.

[21] Appl. No.: 09/175,934

[22] Filed: Oct. 20, 1997

[51] Int. Cl.⁶ .................................................... B29D 11/00
[52] U.S. Cl. ........................ 264/1.33; 264/1.37; 264/2.7; 264/400
[58] Field of Search .................................... 264/1.33, 400, 264/482, 106, 107, 132, 138, 1.37, 2.7

[56] References Cited

U.S. PATENT DOCUMENTS

| | | |
|---|---|---|
| 1,303,842 | 5/1919 | Stout . |
| 1,399,757 | 12/1921 | Emerson . |
| 1,479,847 | 1/1924 | Widmann . |
| 2,010,867 | 8/1935 | Kubo . |
| 3,245,691 | 4/1966 | Gorman . |
| 3,389,636 | 6/1968 | Weitzner et al. . |
| 3,578,539 | 5/1971 | Lash . |
| 4,213,927 | 7/1980 | Alberti ..................................... 264/107 |

FOREIGN PATENT DOCUMENTS

| | | |
|---|---|---|
| 514156 | 11/1992 | European Pat. Off. . |

OTHER PUBLICATIONS

Stargate Printout from Internet Site from Lycos search engine.

*Primary Examiner*—Mathieu D. Vargot
*Attorney, Agent, or Firm*—Edward M. Livingston, Esq

[57] ABSTRACT

A method of making irregular shaped playing discs to achieve proper balance for playing involves the use of a grid (7) divided into quadrants (1, 2, 3, 4) having squares of a predetermined size. A template (8) is placed on the grid (7) into which a desired artwork (9) is fitted. The artwork may include face of a recording star, holiday character or other desired item. The artwork (9) must be placed within the template (8) so that an equal number of squares is taken from each quadrant (1, 2, 3, 4) of the grid (7) within the template (8). Once the shape of the artwork is determined, the recording medium, whether it be audio, visual or a combination of both, is applied. The visual appearance of the artwork (9) may then be silk screened or otherwise applied to the disc. Once the above method is accomplished, the disc can be used as a master for making a mold to premold other discs or each disc may be cut around the perimeter of the artwork to result in discs in the shape of the artwork.

15 Claims, 2 Drawing Sheets

METHOD FOR MAKING IRREGULAR SHAPED CD'S AND OTHER PLAYING DISCS

BACKGROUND OF THE INVENTION

This invention relates to playing discs and more particularly to a method for making irregular shaped discs, such as CDs and DVDs, which are playable on current recording devices.

Generally, heretofore audio playing discs, such as CDs, have only been circular in shape. One reason for the latter requirement is so that the audio playing discs are balanced and play properly while spinning on a spindle of a CD player, turntable or other playing device. However, many people, especially teenagers and even others for novelty use during the holidays, desire irregular shaped CDs and DVDs. CDs having the shape and face of recording stars and novelty CDs for the holidays, such as CDs shaped like Santa Claus, or shaped greeting cards, if made by recording companies, would likely be a "hot" item for purchase by consumers. The major problem with making irregular-shaped audio playing discs is that they must be designed so the center of gravity is in the middle and the CD is balanced so that it does not fly off a spindle when played.

Thus, a need exists for a method for making irregular shaped CDs and other audio playing devices that can still play properly.

The prior art does not disclose any method like the present invention. For instance, U.S. Pat. No. 1,303,842 issued to Stout on May 13, 1919, discloses a postcard with circular sound recording material on it. U.S. Pat. No. 1,399,757 issued to Emerson on Dec. 13, 1921, discloses a tablet having the shape of a character containing a circular record attached thereto. U.S. Pat. No. 1,479,847 issued to Widmann on Jan. 8, 1924, discloses a circular phonograph record attached to a character. U.S. Pat. No. 2,010,867 issued to Kubo on Aug. 13, 1935, discloses a postcard with an aluminum sheet attached thereto for phonographic recording. U.S. Pat. No. 3,245,691 issued to Gorman on Apr. 12, 1966, covers a receptacle for a record having sound reproducing means on the surface. U.S. Pat. No. 3,389,636 issued to Weitzner, et al. on Jun. 25, 1968, discloses a video and audio recorded for an optical slide with recording material on it. U.S. Pat. No. 3,578,539 issued to Lash on May 11, 1971, teaches a method of making picture records. U.S. Pat. No. 4,213,927 issued to Alberti on Jul. 22, 1980, teaches a method of making a picture phonograph record. Finally, European Patent No. 514156, dated Nov. 19, 1992, teaches a CD package having a card with a printable surface thereon.

Other more pertinent art includes irregular shaped CDs found on an Internet search using the Lycos search engine which revealed shaped CDs sold under the Stargate name. However, the Stargate CDs require at least three points of the design reach the edge of a CD and have limitations on playing, such as the CDs cannot be played on all automobile CD players or all CD changers.

On the other hand, the present invention provides a method of making irregular shaped CDs and other recording discs which allows such discs to be playable on all playing devices.

SUMMARY OF THE INVENTION

A major object of the present invention is to provide an audio playing disc that is non-circular or irregular in shape.

Another object of the present invention is to provide such an irregular shaped playing disc that may contain selected artwork on its face.

A further object of the present invention is to provide such an audio playing disc which can be played on any standard playing device.

The present invention accomplishes the above and other objects by providing a method of making non-circular shaped playing discs. The method involves dividing the circular disc into quadrants and imposing a grid having squares of a predetermined size. Then a template having a standard geometric shape is placed on the grid. The template may take the form of any standard geometric shape, be it a triangle, square, rectangle, pentagon, hexagon or octagon. Next, a design having a perimeter falling within the template is drawn in a manner such that an equal number of squares in each quadrant of the grid are outside the perimeter of the design. Then a medium, whether it be audio or visual, is applied within a circle having a circumference which falls within the perimeter of the design. Finally, the playing disc is cut around the perimeter of the design. The playing disc may be a CD, DVD or other audio or visual playing disc. The design utilized may be visual artwork, such as the face of a recording star, a holiday character or similar item. The cutting of the disc would be done preferably by laser, but could also be accomplished by other means or even molded in the shape of the design from the beginning.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
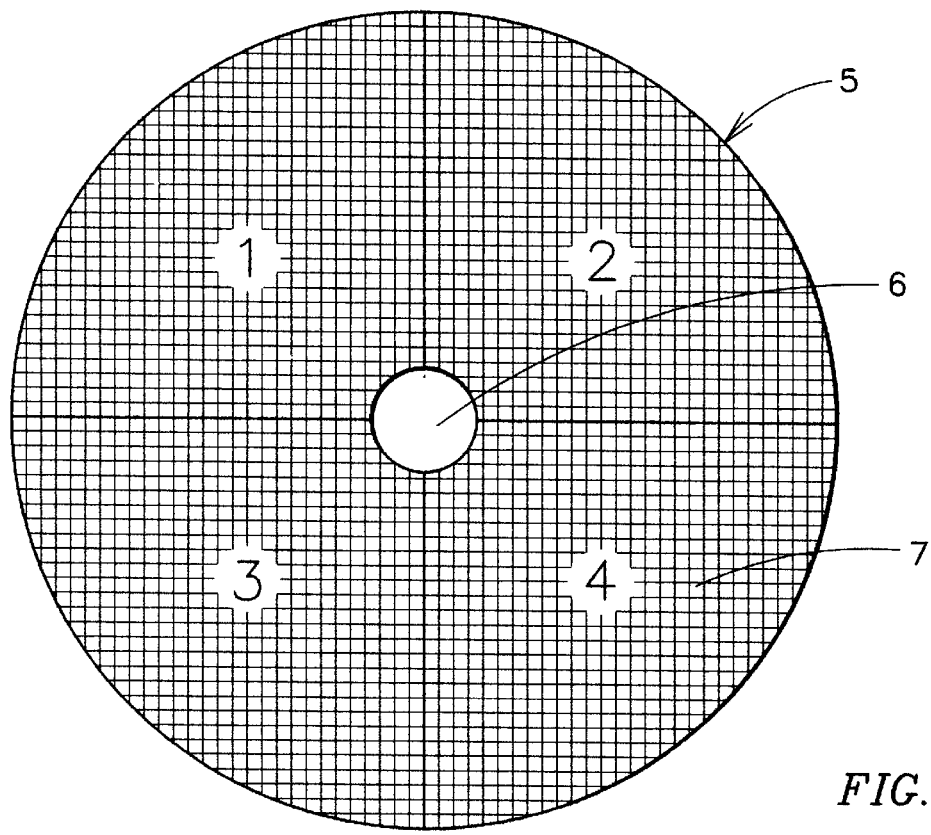
FIG. 1 is a top view of a standard circular playing disc being a compact disc divided into quadrants and grid.

For purposes of describing the preferred embodiment, the terminology used in reference to the numbered components in the drawings is as follows:

| | |
|---|---|
| 1. | quadrant no. 1 |
| 2. | quadrant no. 2 |
| 3. | quadrant no. 3 |
| 4. | quadrant no. 4 |
| 5. | compact disc (CD) |
| 6. | center hole for spindle |
| 7. | grid squares |
| 8. | template |
| 9. | artwork |
| 10. | sides of template |
| 11. | beveled edge of disc |
| 12. | first recording circular perimeter |
| 13. | second recording circular perimeter |
| 14. | third recording circular perimeter |

Referring now to the drawings, FIG. 1 shows a standard audio recording disc, in this case a compact disc (CD) 5 which for the purposes of the present method has been divided into quadrants 1, 2, 3 and 4 and a grid of horizontal and vertical lines imposed to form grid squares 7. A standard compact disc has a diameter of 118 millimeters and a center hole 6 for holding it on a rotating playing spindle of 17 millimeters in diameter. The surface area of an entire compact disc is 370.72 square millimeters and without the center hole is 317.32 square millimeters. Preferably the grid squares 7 would have a size of no more than 2 millimeters in order to achieve proper balancing using the method of the present invention.

Figure 2:
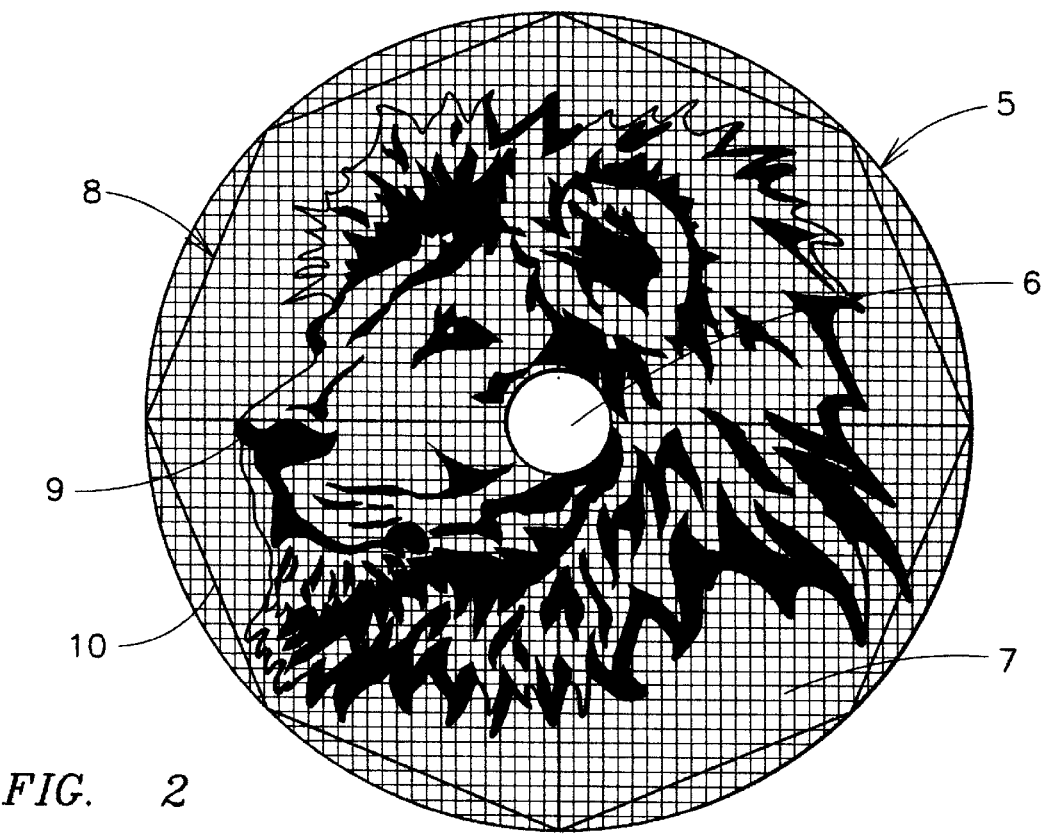
FIG. 2 is a top view of the standard playing compact disc with a selected template with selected artwork placed therein.

Once the CD 5 has been divided into a grid as shown in FIG. 1, an artwork template 8 as shown in FIG. 2 is selected and placed over the grid. Preferably, the template 8 would take the form of one of six geometric shapes. The shapes could include a triangle, square, rectangle, pentagon, hexagon or octagon, depending on the artwork which would ultimately be placed on the disc. The geometric shape selected would have a plurality of sides, such as 10. In this case the geometric shape selected, as shown in FIG. 2, is an octagonally-shaped template 8. For the purpose of discussion here, the artwork 9 is a lion. However, almost any artwork or design, including, but not limited to, the face of a recording star or a character, could be used. The artwork 9 should be placed as close as possible to the edges of a template 8 so that when a disc is cut, proper balancing will be achieved. The balancing process is accomplished by calculating the number of squares that would be removed once the CD is cut in the shape of a selected artwork. In order to achieve proper balance the same number of squares, which corresponds to weight, is taken from each quadrant of the grid. Otherwise, the compact disc when cut in the shape of the selected artwork may not play in all compact disc players.

Figure 3:
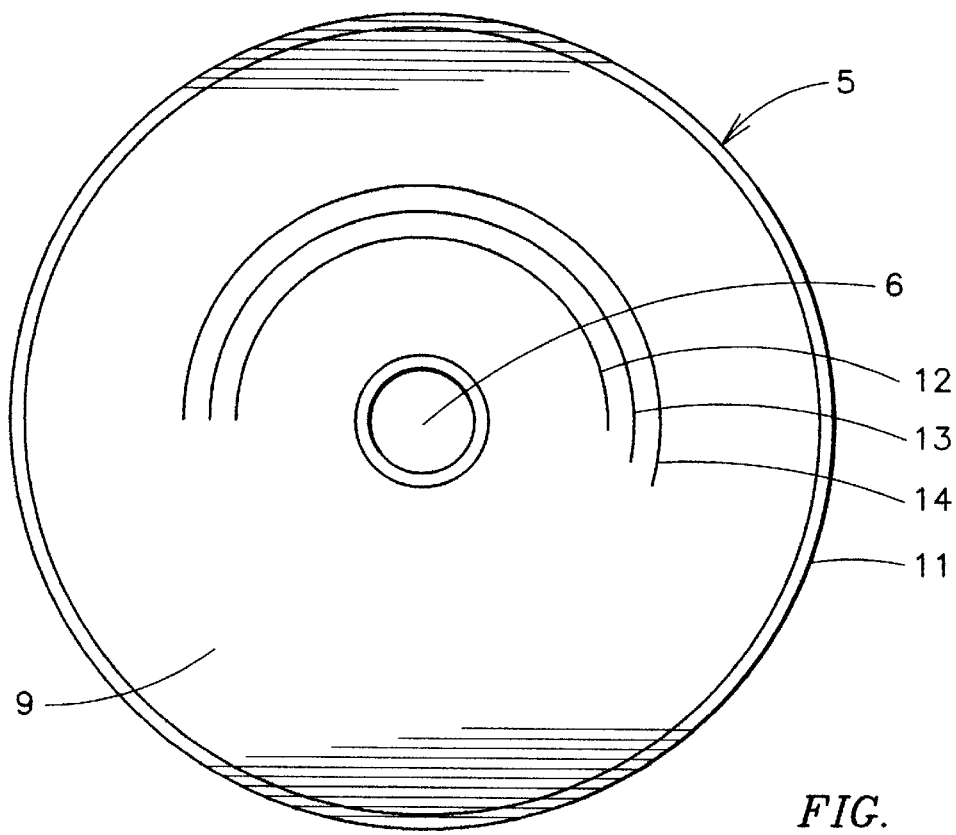
FIG. 3 is a top view of a playing disc showing recording lines placed within the artwork design.

Once the artwork 9 has been sized on the disc 5, recording in the desired medium, audio, visual or combination thereof, can be placed on the disc. In the case of a CD, the recording would be placed on the CD in a circular fashion from the center towards the outer edge as shown in FIG. 3. So long as the circles of recording stay within the perimeter of the artwork, as many minutes as can fit may be placed on the disc. As shown in FIG. 3 in the case of this artwork 9, up to a total of ten playing minutes, the length of three normal selections, can be inserted. The first selection 12 would have an outer circumference of 28 millimeters, the second selection 13 31.35 millimeters, and the third selection 14 34.7 millimeters.

Figure 4:
FIG. 4 is a top view of the playing disc cut in the shape of the artwork.

Once the recording has been placed on the disc, the CD 5 may be cut in the shape of the artwork 9, as shown in FIG. 4. The CD 5 would preferably be cut by use of a laser guided by a preprogramed computer. However, the disc itself could even be premolded in the shape of the desired artwork as well, particularly for mass production when it would be cost effective to do so.

Although a preferred embodiment of the present invention has been described in detail hereinabove, all improvements and modifications to this invention within the scope or equivalents of the claims are covered by this invention.

Having thus described my invention, I claim:

1. A method of making a non-circular shaped playing disc comprising the steps of:

(a) dividing a template of a circular disc into quadrants and grid having squares of a predetermined size;

(b) placing a design on the template of the circular disc, said design having a perimeter within the template such that an equal number of squares in each quadrant are outside the perimeter of the design;

(c) applying a medium to be played on the disc within the perimeter of the design; and, (d) cutting the disc around the perimeter of the design.

2. The method of claim 1 wherein the size of the squares is 2 millimeters.

3. The method of claim 1 or 2 wherein the design is a triangle.

4. The method of claim 1 or 2 wherein the design is a square.

5. The method of claim 1 or 2 wherein the design is a rectangle.

6. The method of claim 1 or 2 wherein the design is a pentagon.

7. The method of claim 1 or 2 wherein the design is a hexagon.

8. The method of claim 1 or 2 wherein the design is a octagon.

9. The method of claim 1 or 2 wherein the playing disc contains an audio playing medium.

10. The method of claim 1 or 2 wherein the playing disc contains a visual playing medium.

11. The method of claim 1 or 2 wherein the playing disc contains a combination of audio and visual playing medium.

12. The method of claim 1 or 2 wherein the design is a visual artwork.

13. The method of claim 12 wherein the visual artwork is a face of a recording star.

14. The method of claim 12 wherein the visual artwork is a holiday character.

15. The method of claim 1 wherein cutting the disc is accomplished using a laser.

* * * * *

UNITED STATES PATENT AND TRADEMARK OFFICE
CERTIFICATE OF CORRECTION

PATENT NO : 5,942,165
DATED : 08/24/99
INVENTOR(S): Michael A. Sabatini

It is certified that error appears in the above-identified patent and that said Letters Patent is hereby corrected as shown below:

In the heading, the filing date should be changed to the correct date --Oct. 20, 1998--.

Signed and Sealed this

Second Day of May, 2000

Attest:

Q. TODD DICKINSON

Attesting Officer

Director of Patents and Trademarks